US010801246B2

(12) United States Patent
Elie et al.

(10) Patent No.: US 10,801,246 B2
(45) Date of Patent: Oct. 13, 2020

(54) PROGRAMMABLE DOOR POWER ASSIST

(71) Applicant: Ford Global Technologies, LLC, Dearborn, MI (US)

(72) Inventors: Larry Dean Elie, Ypsilanti, MI (US); Timothy J. Potter, Dearborn, MI (US); Robert F. Novak, Farmington Hills, MI (US); John Wayne Jaranson, Dearborn, MI (US); Jeff A. Wallace, Walled Lake, MI (US); Michael M. Azzouz, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/171,704

(22) Filed: Oct. 26, 2018

(65) Prior Publication Data
US 2019/0063138 A1 Feb. 28, 2019

Related U.S. Application Data

(62) Division of application No. 14/812,092, filed on Jul. 29, 2015, now Pat. No. 10,145,165.

(51) Int. Cl.
*E05F 15/70* (2015.01)
*E05D 5/06* (2006.01)
(Continued)

(52) U.S. Cl.
CPC .............. *E05F 15/70* (2015.01); *B60J 5/047* (2013.01); *E05D 5/062* (2013.01); *E05F 15/60* (2015.01);
(Continued)

(58) Field of Classification Search
None
See application file for complete search history.

(56) References Cited

U.S. PATENT DOCUMENTS

| 2,721,353 A | 10/1955 | Mackintosh |
| 2,915,777 A | 12/1959 | Allen |

(Continued)

FOREIGN PATENT DOCUMENTS

| CA | 2034320 C | 11/1994 |
| CN | 101403271 A | 4/2009 |

(Continued)

OTHER PUBLICATIONS

Steeven Zeiß, Alexander Marinc, Andreas Braun, Tobias Große-Puppendahl, Sebastian Beck; "A Gesture-based Door Control Using Capacitive Sensors"; Fraunhofer-Institut für Graphische Datenverarbeitung IGD; pp. 1-10; date unknown.

(Continued)

*Primary Examiner* — Gregory J Strimbu
(74) *Attorney, Agent, or Firm* — David Coppiellie; Price Heneveld LLP

(57) ABSTRACT

A power assist device includes a motor that is operatively coupled to a door of a vehicle, a display for displaying a swing path of the door, a controller for controlling the motor, and a touchscreen device for supplying the controller with one or more user-inputted selections for controlling a door swing of the door, wherein the user-inputted selections are received by the touchscreen device via one or more touch events.

19 Claims, 11 Drawing Sheets

(51) Int. Cl.
   *E05F 15/614* (2015.01)
   *E05F 15/60* (2015.01)
   *B60J 5/04* (2006.01)
   *E05D 3/02* (2006.01)

(52) U.S. Cl.
   CPC ...... *E05F 15/614* (2015.01); *E05D 2003/027* (2013.01); *E05Y 2400/32* (2013.01); *E05Y 2400/36* (2013.01); *E05Y 2400/44* (2013.01); *E05Y 2400/80* (2013.01); *E05Y 2400/816* (2013.01); *E05Y 2600/626* (2013.01); *E05Y 2900/531* (2013.01)

(56) References Cited

U.S. PATENT DOCUMENTS

| | | | |
|---|---|---|---|
| 3,344,554 A | 10/1967 | Misaka et al. | |
| 3,357,137 A | 12/1967 | Lombardi et al. | |
| 3,895,281 A | 7/1975 | Corbaz | |
| 4,078,770 A | 3/1978 | Yates et al. | |
| 4,143,497 A | 3/1979 | Offenbacher | |
| 4,386,398 A | 5/1983 | Matsuoka et al. | |
| 4,441,376 A | 4/1984 | Tobey | |
| 4,488,753 A | 12/1984 | Kolke | |
| 4,497,137 A | 2/1985 | Nelson | |
| 4,501,012 A | 2/1985 | Kishi et al. | |
| 4,501,090 A | 2/1985 | Yoshida et al. | |
| 4,674,230 A * | 6/1987 | Takeo | E05C 17/003 49/28 |
| 4,727,679 A | 3/1988 | Kornbrekke et al. | |
| 4,763,111 A | 8/1988 | Matsuo et al. | |
| 4,899,945 A | 2/1990 | Jones | |
| 4,952,080 A | 8/1990 | Boiucaner et al. | |
| 4,959,598 A | 9/1990 | Yoshida et al. | |
| 5,236,234 A | 8/1993 | Norman | |
| 5,317,835 A | 6/1994 | Dupuy et al. | |
| 5,355,628 A | 10/1994 | Dranchak | |
| 5,369,911 A | 12/1994 | Fortunato | |
| 5,396,158 A | 3/1995 | Long et al. | |
| 5,434,487 A | 7/1995 | Long et al. | |
| 5,787,636 A | 8/1998 | Buchanan, Jr. | |
| 5,801,340 A | 9/1998 | Peter | |
| 5,913,763 A | 6/1999 | Beran et al. | |
| 6,065,185 A | 5/2000 | Breed et al. | |
| 6,145,354 A | 11/2000 | Kondo et al. | |
| 6,247,271 B1 | 6/2001 | Fioritto et al. | |
| 6,275,231 B1 | 8/2001 | Obradovich | |
| 6,305,737 B1 | 10/2001 | Corder et al. | |
| 6,341,807 B2 | 1/2002 | Cetnar et al. | |
| 6,370,732 B1 | 4/2002 | Yezersky et al. | |
| 6,401,392 B1 | 6/2002 | Yuge | |
| 6,435,575 B1 | 8/2002 | Pajak et al. | |
| 6,442,902 B1 | 9/2002 | Van Den Oord | |
| 6,498,970 B2 | 12/2002 | Colmenarez et al. | |
| 6,624,605 B1 | 9/2003 | Powder et al. | |
| 6,777,958 B2 | 8/2004 | Haag et al. | |
| 6,928,694 B2 | 8/2005 | Breed et al. | |
| 7,034,682 B2 | 4/2006 | Beggs et al. | |
| 7,045,764 B2 | 5/2006 | Beggs et al. | |
| 7,068,146 B2 | 6/2006 | Sasaki et al. | |
| 7,132,642 B2 | 11/2006 | Shank et al. | |
| 7,175,227 B2 | 2/2007 | Menard | |
| 7,193,509 B2 | 3/2007 | Bartels et al. | |
| 7,215,529 B2 | 5/2007 | Rosenau | |
| 7,273,207 B2 | 9/2007 | Studer | |
| 7,280,035 B2 | 10/2007 | McLain et al. | |
| 7,320,497 B2 | 1/2008 | Zinn et al. | |
| 7,342,373 B2 | 3/2008 | Newman et al. | |
| 7,377,557 B2 | 5/2008 | Shelley et al. | |
| 7,400,153 B2 | 7/2008 | Shoji et al. | |
| 7,438,346 B1 | 10/2008 | Breed | |
| 7,439,632 B2 | 10/2008 | Ogino et al. | |
| 7,538,506 B2 | 5/2009 | Zinn et al. | |
| 7,686,378 B2 | 3/2010 | Gisler et al. | |
| 7,688,179 B2 | 3/2010 | Kurpinski et al. | |
| 7,874,609 B2 | 1/2011 | Whinnery | |
| 7,886,409 B2 | 2/2011 | Yip | |
| 8,077,022 B2 | 12/2011 | Baruco et al. | |
| 8,132,844 B2 | 3/2012 | Sonnek et al. | |
| 8,159,231 B2 | 4/2012 | Sakamaki | |
| 8,169,317 B2 | 5/2012 | Lemerand et al. | |
| 8,186,013 B2 | 5/2012 | Yip | |
| 8,237,544 B2 | 8/2012 | Nakashima | |
| 8,284,022 B2 | 10/2012 | Kachouh | |
| 8,397,581 B2 | 3/2013 | Ruby, III et al. | |
| 8,511,739 B2 | 8/2013 | Brown et al. | |
| 8,615,927 B2 | 12/2013 | Ezzat et al. | |
| 8,641,125 B2 | 2/2014 | Jimenez et al. | |
| 8,651,461 B2 | 2/2014 | Christensen et al. | |
| 8,909,422 B2 * | 12/2014 | Morimoto | B61D 37/00 701/36 |
| 10,145,165 B2 * | 12/2018 | Elie | E05F 15/60 |
| 10,253,535 B2 * | 4/2019 | Gruber | E05C 17/006 |
| 2001/0004164 A1 | 6/2001 | Mattsson | |
| 2002/0039008 A1 | 4/2002 | Edgar et al. | |
| 2003/0038544 A1 | 2/2003 | Spurr | |
| 2003/0076062 A1 | 4/2003 | Mullet et al. | |
| 2003/0222758 A1 | 12/2003 | Willats et al. | |
| 2005/0174077 A1 | 8/2005 | Haag et al. | |
| 2005/0242618 A1 | 11/2005 | Menard | |
| 2005/0280284 A1 | 12/2005 | McLain et al. | |
| 2006/0230574 A1 | 10/2006 | Murayama et al. | |
| 2006/0235753 A1 * | 10/2006 | Kameyama | B60H 1/00742 705/15 |
| 2007/0090654 A1 | 4/2007 | Eaton | |
| 2007/0186480 A1 | 8/2007 | Freeman | |
| 2007/0192038 A1 | 8/2007 | Kameyama | |
| 2008/0211519 A1 | 9/2008 | Kurumado et al. | |
| 2008/0294314 A1 | 11/2008 | Morris et al. | |
| 2008/0295408 A1 | 12/2008 | Heissler | |
| 2008/0296927 A1 | 12/2008 | Gisler et al. | |
| 2009/0113797 A1 | 5/2009 | Hoermann | |
| 2009/0153151 A1 | 6/2009 | Cho et al. | |
| 2009/0265992 A1 | 10/2009 | Hass et al. | |
| 2010/0224117 A1 | 9/2010 | Christensen et al. | |
| 2011/0203181 A1 | 8/2011 | Magner et al. | |
| 2011/0260848 A1 | 10/2011 | Rodriguez Barros et al. | |
| 2011/0295469 A1 | 12/2011 | Rafii et al. | |
| 2012/0029701 A1 | 2/2012 | Houser | |
| 2012/0042572 A1 | 2/2012 | Yuge | |
| 2012/0179336 A1 | 7/2012 | Oakley | |
| 2013/0031747 A1 | 2/2013 | Gobart et al. | |
| 2013/0074412 A1 * | 3/2013 | Wellborn | E05C 17/203 49/381 |
| 2013/0091768 A1 | 4/2013 | Houser et al. | |
| 2013/0127479 A1 | 5/2013 | Grills et al. | |
| 2013/0138303 A1 | 5/2013 | McKee et al. | |
| 2013/0144495 A1 | 6/2013 | Yu | |
| 2013/0151071 A1 | 6/2013 | Lee | |
| 2013/0239485 A1 | 9/2013 | Reed et al. | |
| 2013/0289829 A1 * | 10/2013 | Ho | B60K 37/06 701/48 |
| 2014/0000165 A1 | 1/2014 | Patel et al. | |
| 2014/0055349 A1 | 2/2014 | Itoh | |
| 2014/0150581 A1 | 6/2014 | Scheuring et al. | |
| 2014/0297060 A1 | 10/2014 | Schmidt et al. | |
| 2014/0373454 A1 | 12/2014 | Sasaki | |
| 2015/0059250 A1 * | 3/2015 | Miu | E05F 15/611 49/349 |
| 2015/0096233 A1 | 4/2015 | Kojima et al. | |
| 2015/0262438 A1 * | 9/2015 | Zasowski | G07C 9/00126 340/5.51 |
| 2015/0283886 A1 * | 10/2015 | Nania | E05F 15/73 296/146.4 |
| 2016/0010379 A1 * | 1/2016 | Sauerwein | E05F 5/00 701/49 |

(56) References Cited

U.S. PATENT DOCUMENTS

| | | | | |
|---|---|---|---|---|
| 2016/0052375 | A1* | 2/2016 | Scheuring | B60J 5/047 74/89.38 |
| 2017/0159347 | A1 | 6/2017 | Mayr | |

FOREIGN PATENT DOCUMENTS

| | | | |
|---|---|---|---|
| CN | 201343938 | Y | 11/2009 |
| CN | 202294674 | U | 7/2012 |
| CN | 103132847 | A | 6/2013 |
| CN | 103269914 | A | 8/2013 |
| CN | 203143980 | U | 8/2013 |
| CN | 103422764 | A | 12/2013 |
| CN | 203551964 | U | 4/2014 |
| CN | 203580775 | U | 5/2014 |
| CN | 104405225 | A | 3/2015 |
| DE | 4119579 | A1 | 12/1992 |
| DE | 4207706 | A1 | 9/1993 |
| DE | 19927871 | A1 | 11/1999 |
| DE | 10004161 | A1 | 8/2001 |
| DE | 10038803 | A1 | 2/2002 |
| DE | 102007062473 | A1 | 7/2009 |
| EP | 0397300 | A2 | 11/1990 |
| EP | 2174814 | A2 | 4/2010 |
| EP | 1265772 | A1 | 12/2010 |
| EP | 2287430 | A2 | 2/2011 |
| EP | 1899565 | B1 | 10/2011 |
| EP | 2583848 | A2 | 4/2013 |
| EP | 2765112 | A1 | 8/2014 |
| FR | 2873074 | A1 | 1/2006 |
| JP | 07285789 | A | 10/1995 |
| JP | 2000080828 | A | 3/2000 |
| JP | 2000318444 | A | 11/2000 |
| JP | 2004176426 | A | 6/2004 |
| JP | 2009161959 | A | 7/2009 |
| JP | 20100095383 | A | 4/2010 |
| JP | 2013007171 | A | 1/2013 |
| JP | 2013028903 | A | 2/2013 |
| JP | 2014129037 | A | 7/2014 |
| JP | 2014148842 | A | 8/2014 |
| KR | 20020048811 | A | 6/2002 |
| KR | 20130068538 | A | 6/2013 |
| WO | 20100098620 | A2 | 9/2010 |
| WO | 2013013313 | A1 | 1/2013 |
| WO | 2013074901 | A2 | 5/2013 |

OTHER PUBLICATIONS

Abd Manan Bin Ahmad; "The Design and Development of a System for Controlling Automotive Functions using Speech Recognition"; Universiti Teknologi Malaysia; pp. 1-100; 2006.

Haleem, M.S.; "Voice Controlled Automation System"; IEEE International; Dept. of Electron. Eng., Ned Univ. of Eng. & Technol.; Multitopic Conference; Print ISBN: 978-1-4244-2823-6; pp. 1-2; Dec. 23-24, 2008.

"InnoTrans 2014: Safety on Vehicle Doors with Non-Touch Detection System from Mayser"; Mayser Safety Technology; pp. 1-1; Aug. 4, 2014.

Bogdan Popa; "How BMW's Soft Close Doors Work"; Autoevolution; pp. 1-6; Aug. 18, 2012.

* cited by examiner

PROGRAMMABLE DOOR POWER ASSIST

CROSS-REFERENCE TO RELATED APPLICATION

This application is a divisional of and claims priority to U.S. patent application Ser. No. 14/812,092, filed on Jul. 29, 2015, entitled "PROGRAMMABLE DOOR POWER ASSIST," the disclosure of which is hereby incorporated herein by reference in its entirety.

FIELD OF THE INVENTION

The present invention generally relates to a device for use on an automotive vehicle door, and more particularly, to a power assist device for the vehicle door providing both opening and closing assistance, as well as limiting the velocity of the swing of the vehicle door when closing.

BACKGROUND OF THE INVENTION

Motor vehicle doors may include device(s) to assist in opening and closing a vehicle door. Device(s) may also include the ability to sense a nearby object that might be contacted when opening the vehicle door for ingress and egress. When opened, if the vehicle door swings fast enough or hits the object hard enough, damage to the door may be sustained. These devices sense the distance to the object, typically using a sensor(s) located on the exterior surface of the door, and determine if it is within the door's projected swing path. Known devices generally cannot provide the momentum necessary to open and close a vehicle door at the hinge location of the door. Thus, a device is desired, wherein the door is opened and closed under the control of a power assistance device that is coupled to one or more hinges of the vehicle door, and further wherein the power assistance device is programmable to allow a user to control door swing behavior. A device having a confined overall package size is desired to carry out the power assist functionality within the standard confines of a vehicle door to vehicle body spacing.

SUMMARY OF THE INVENTION

According to one aspect of the present invention, a power assist device is provided. The power assist device includes a motor that is operatively coupled to a door of a vehicle, a display for displaying as swing path of the door, a controller for controlling the motor, and a touchscreen device for supplying to the controller one or more user-inputted selections for controlling door swing, wherein the user-inputted selections are received by the touchscreen device via one or more touch events.

According to another aspect of the present invention, a vehicle door assembly is provided. The vehicle door assembly includes a door of a vehicle and a power assist device having a motor operatively coupled to the door, a controller for controlling the motor, a display for displaying a swing path of the door, and a touchscreen device for supplying to the controller one or more user-inputted selections for controlling door swing. The user inputted selections are received by the touchscreen device via one or more touch events specifying one or more door detent positions. Each of the one or more door detent positions correspond to a position of the door on the swing path.

According to yet another aspect of the present invention, a method of controlling a vehicle door is provided. The method includes the steps of operatively coupling a motor to the door, displaying a swing path of the door on a display, receiving user-input via one or more touch events on a touchscreen device specifying one or more door detent positions, and controlling the motor based on the user input.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
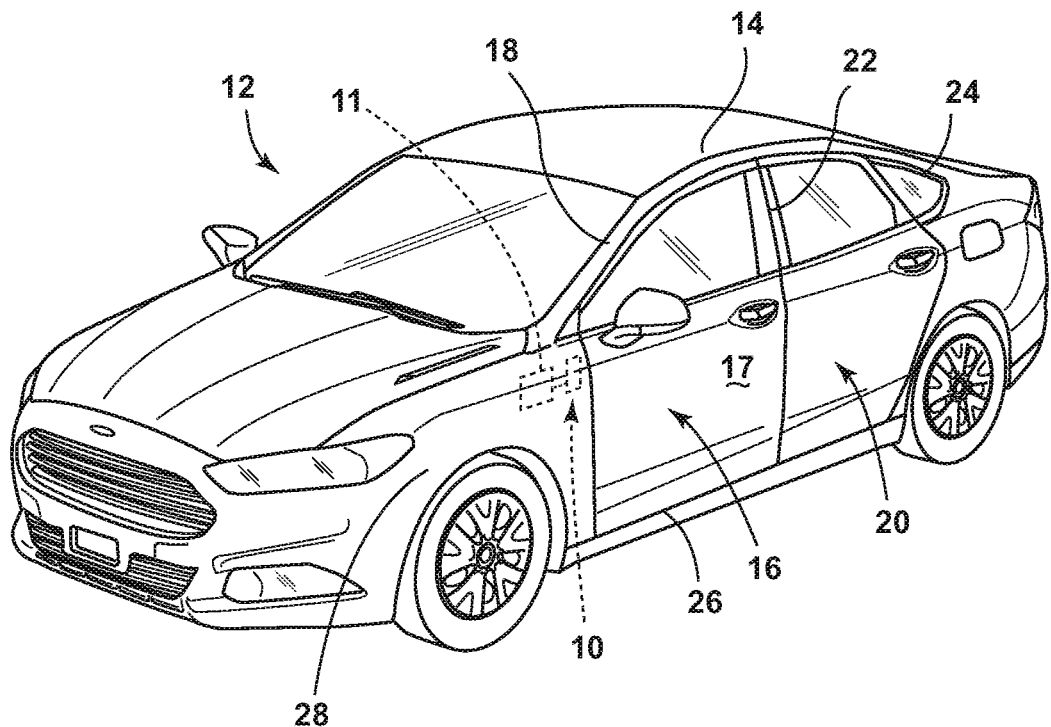
FIG. 1 is a perspective view of a vehicle having a driver's side door in a closed position with a power assist device coupled thereto according to an embodiment.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally designates a power assist device disposed on an exemplary motor vehicle 12. The motor vehicle 12 illustrated in FIG. 1 is an exemplary embodiment of an automotive vehicle or car having a vehicle body 14 upon which a door 16 is rotatably mounted. As shown in FIG. 1, the power assist device 10 is disposed adjacent to the door 16 and is operably and structurally coupled to the door 16 for assisting in moving the door 16 between open and closed positions, as further described below. Movement of the door 16 is controlled by a controller 11 which is configured to control the power assist device 10. The door 16 illustrated in FIG. 1 is a front side door, specifically a driver's side door; however, any vehicle door is contemplated for use with the power assist device 10 of the present concept. The door 16 is shown hinged to an A-pillar 18 of the vehicle body 14 by means of one or more hinges, as further described below. The door 16 includes an outer panel 17 and is shown in FIG. 1 in a closed position, wherein it is contemplated that the door 16 is latched to a B-pillar 22 of the vehicle body 14. The vehicle 12 further includes a rear door 20 which is hingedly coupled to the B-pillar 22 for latching to a C-pillar 24 in assembly. The vehicle body 14 further includes a rocker panel 26 and a front driver's side quarter panel 28, as shown in FIG. 1.

Figure 2:
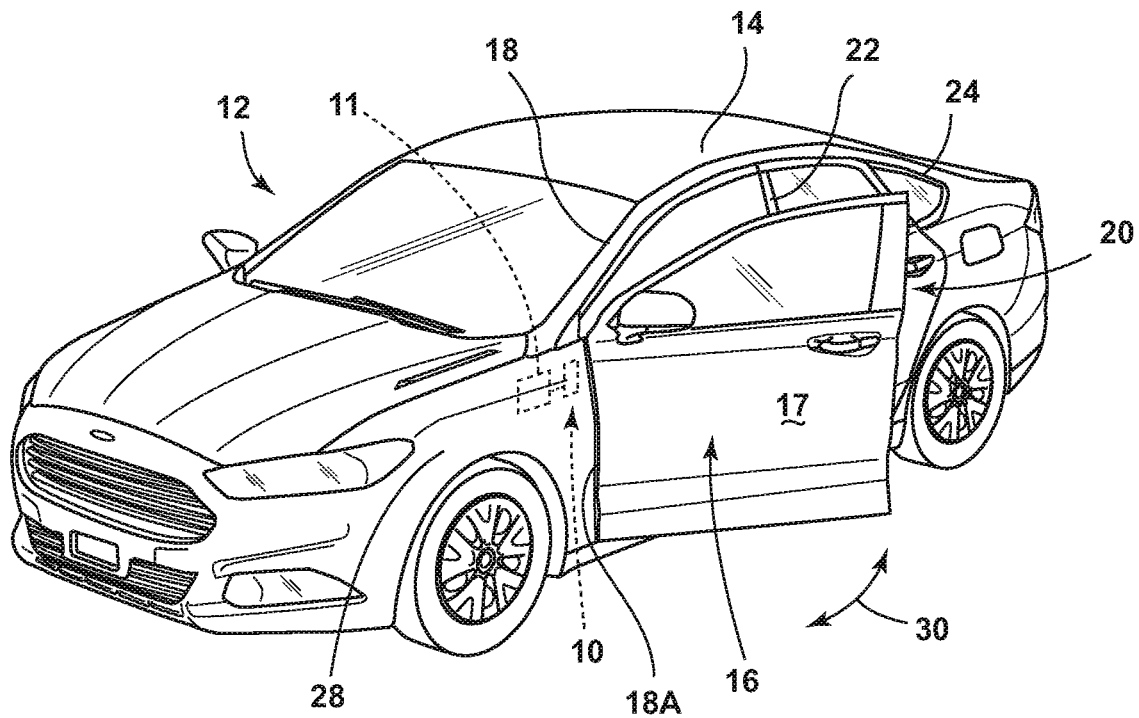
FIG. 2 is a perspective view of the vehicle of FIG. 1 with the driver's side door shown in an open position.

Referring now to FIG. 2, the door 16 is shown in an open position. The door 16 pivots or swings along a door swing path as indicated by arrow 30 between open and closed positions as hingedly coupled to a hinge-pillar 18A of the A-pillar 18. Movement of the door 16 between open (FIG. 2) and closed (FIG. 1) positions is contemplated to be optionally powered by the power assist device 10.

Figure 3:
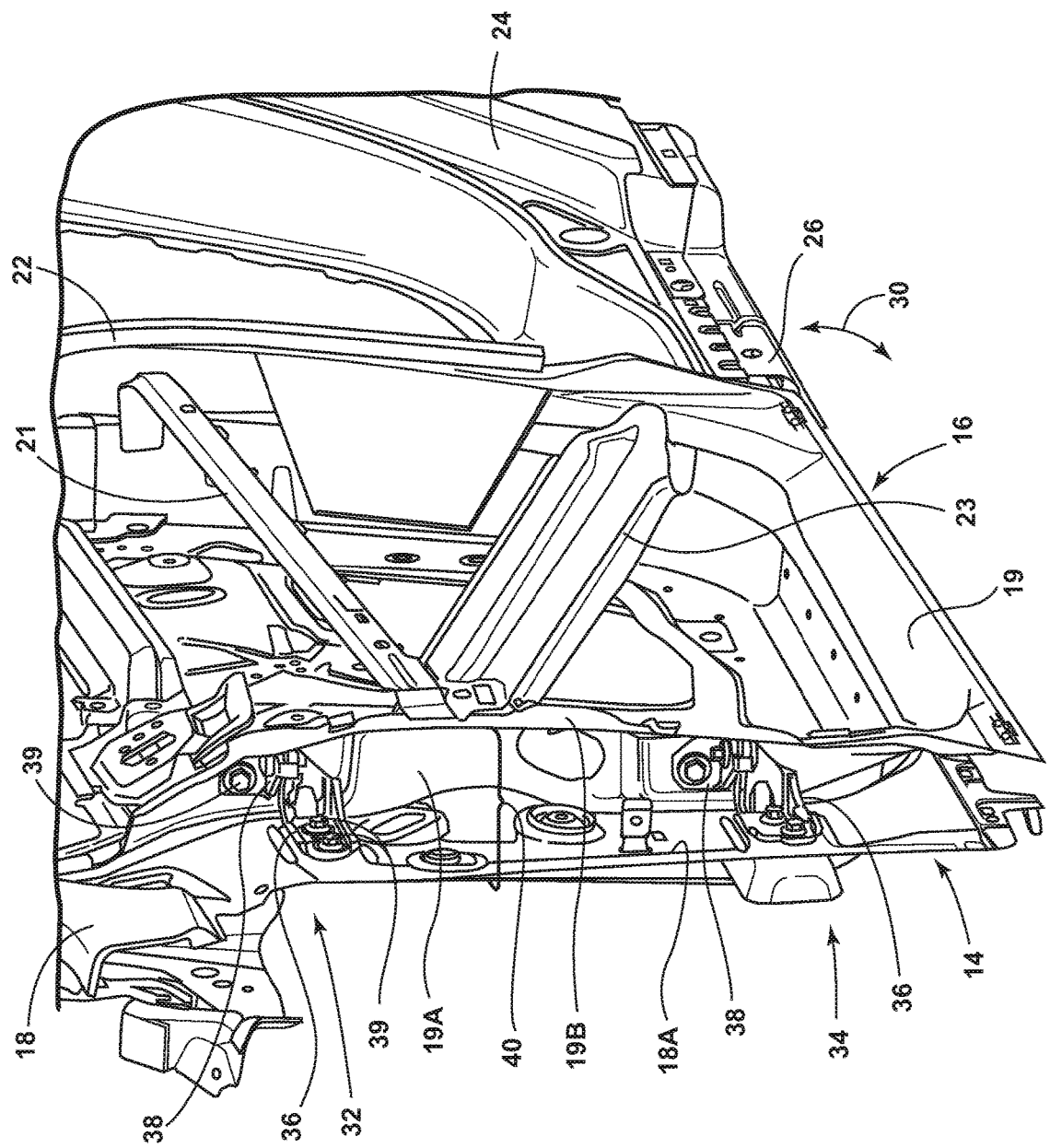
FIG. 3 is a fragmentary perspective view of a vehicle door with an outer panel removed to show a connection between an inner panel of the door and a hinge pillar of the vehicle.

Referring now to FIG. 3, the door 16 is shown in the closed position with the outer panel 17 (FIGS. 1 and 2) removed to reveal upper and lower hinge assemblies 32, 34 coupled to an inner panel 19 of the door 16. The upper and lower hinge assemblies 32, 34 rotatably couple the door 16 to the vehicle body 14 at hinge-pillar 18A and are configured to carry the load of the door 16 as the door 16 moves between the open and closed positions. A door check (not shown) may also be used to help carry the load of the door 16, and is generally positioned between the upper and lower hinge assemblies 32, 34 along the inner panel 19. The upper and lower hinge assemblies 32, 34 are substantially similar having component parts which will be described herein using the same reference numerals for both the upper and lower hinge assemblies 32, 34. Specifically, the upper hinge assembly 32 is defined by a fixed hinge portion 36 and a moveable hinge portion 38. The fixed hinge portion 36 and the moveable hinge portion 38 are generally defined by brackets that pivotally couple the door 16 to the A-pillar 18. Specifically, the fixed hinge portion 36 is mounted to the A-pillar 18 at hinge-pillar 18A using fasteners 39, or other like coupling means. The moveable hinge portion 38 is rotatably mounted to the fixed hinge portion 36 by a hinge pin (identified and described below) which allows with the moveable hinge portion 38 to pivot with respect to the fixed hinge portion 36 as the door 16 opens and closes along the door swing path 30. The moveable hinge portion 38 is fixedly coupled to a sidewall 19A of the inner panel 19 by fastener 39.

As further indicated in FIG. 3 a package compartment 40 is defined by sidewall 19A and sidewall 19B of the inner door panel 19, as well as hinge-pillar 18A. As shown in FIG. 3, sidewall 19A is substantially perpendicular to sidewall 19B, and sidewall 19B is substantially parallel to hinge-pillar 18A. The package compartment 40 is generally closed off by a portion of the front quarter panel 28 (FIGS. 1 and 2) in assembly. As further shown in FIG. 3, the package compartment 40 defines a gap or space for mounting the power assist device 10, as further described below with reference to FIG. 4A. The volume of space defined by the package compartment 40 is limited and is generally at a premium in this location in most automotive vehicles. Thus, it is an object of the present concept to provide an effective power assist device that can properly fit within the confines of the package compartment 40 without modification to the existing structures defining the boundaries of the package compartment 40. As further shown in FIG. 3, the door 16 may also include one or more reinforcement belts 21, 23 for reinforcing the inner panel 19 from torque forces imparted by the power assist device 10 on the door 16.

Figure 4A:
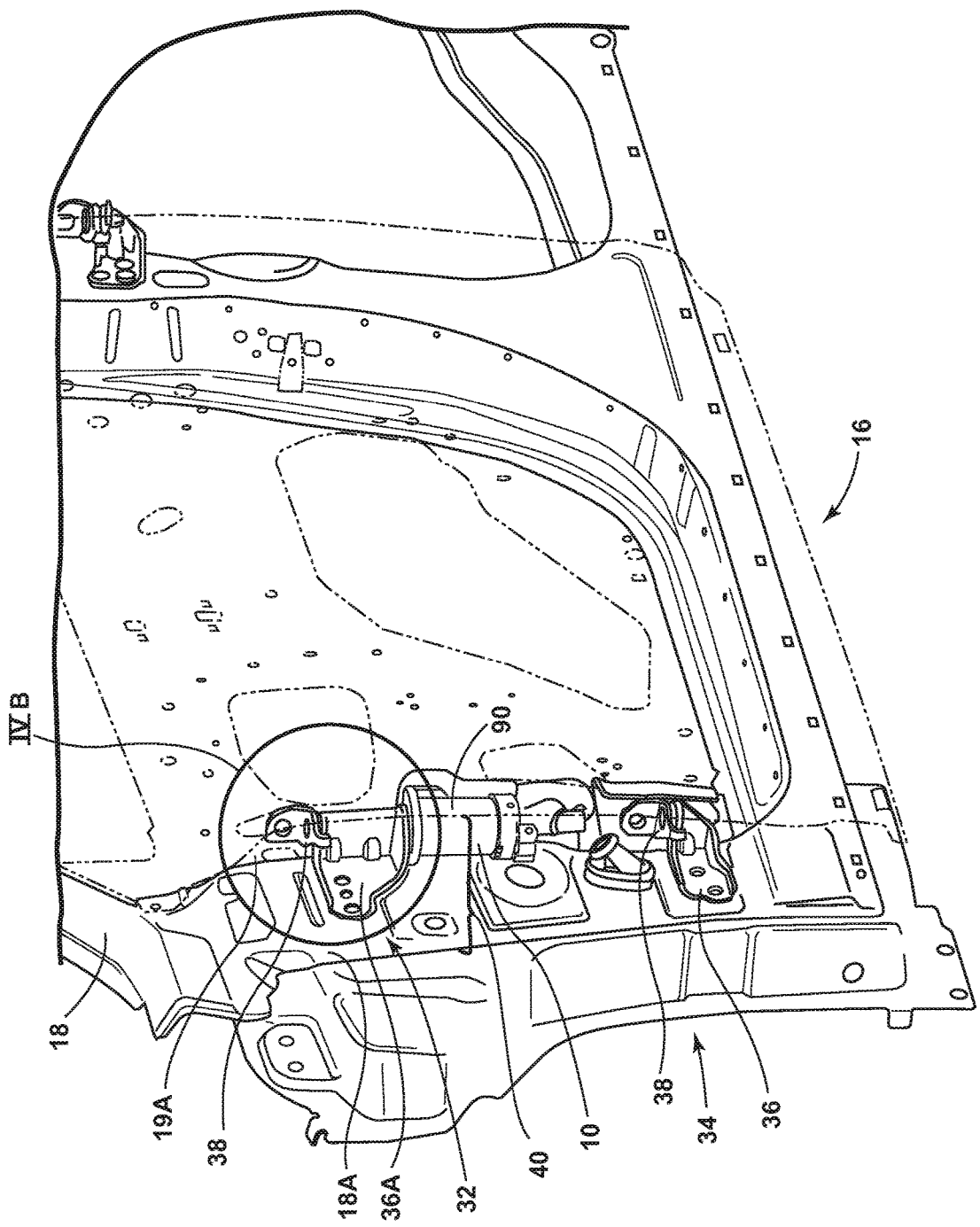
FIG. 4A is a fragmentary perspective view of a vehicle door shown with an inner panel in phantom in a closed position and a power assist device disposed between the door and the hinge pillar.

Referring now to FIG. 4A, the power assist device 10 is shown disposed in the package compartment 40 between the door 16 and the hinge-pillar 18A. The power assist device 10 shown in FIG. 4A has a generally cylindrical body portion 90 which is contemplated to be approximately 70 mm in diameter and 115 mm in vertical length. Having such a configuration, the power assist device 10 can fit into the boundaries of the confined package compartment 40. In the embodiment shown in FIG. 4A, the upper hinge assembly 32 includes a modified fixed hinge portion 36A which is wider and more robust as compared to the fixed hinge portion 36 shown in FIG. 3. The modified fixed hinge portion 36A is shown in FIG. 4A as mounted on the hinge-pillar 18A. The moveable hinge portion 38 is shown disposed on an upper mounting portion 54 (FIG. 4B) of the fixed hinge portion 36A, and the power assist device 10 is disposed on a lower mounting portion 56 (FIG. 4B) of the fixed hinge portion 36A. The modified fixed hinge portion 36A provides a robust connection between the upper hinge assembly 32 and the hinge-pillar 18A for carrying the load of the door 16, as well as carrying the load of any torque imparted by the power assist device 10 when used to assist in opening and closing the door 16. It is contemplated that the door 16, as most conventional vehicle doors, can weigh approximately 90 lbs. or more as an assembled unit. Further information regarding the torque requirements necessary for moving the door 16 as powered from the hinge location by a power assist device are discussed below.

Figure 4B:
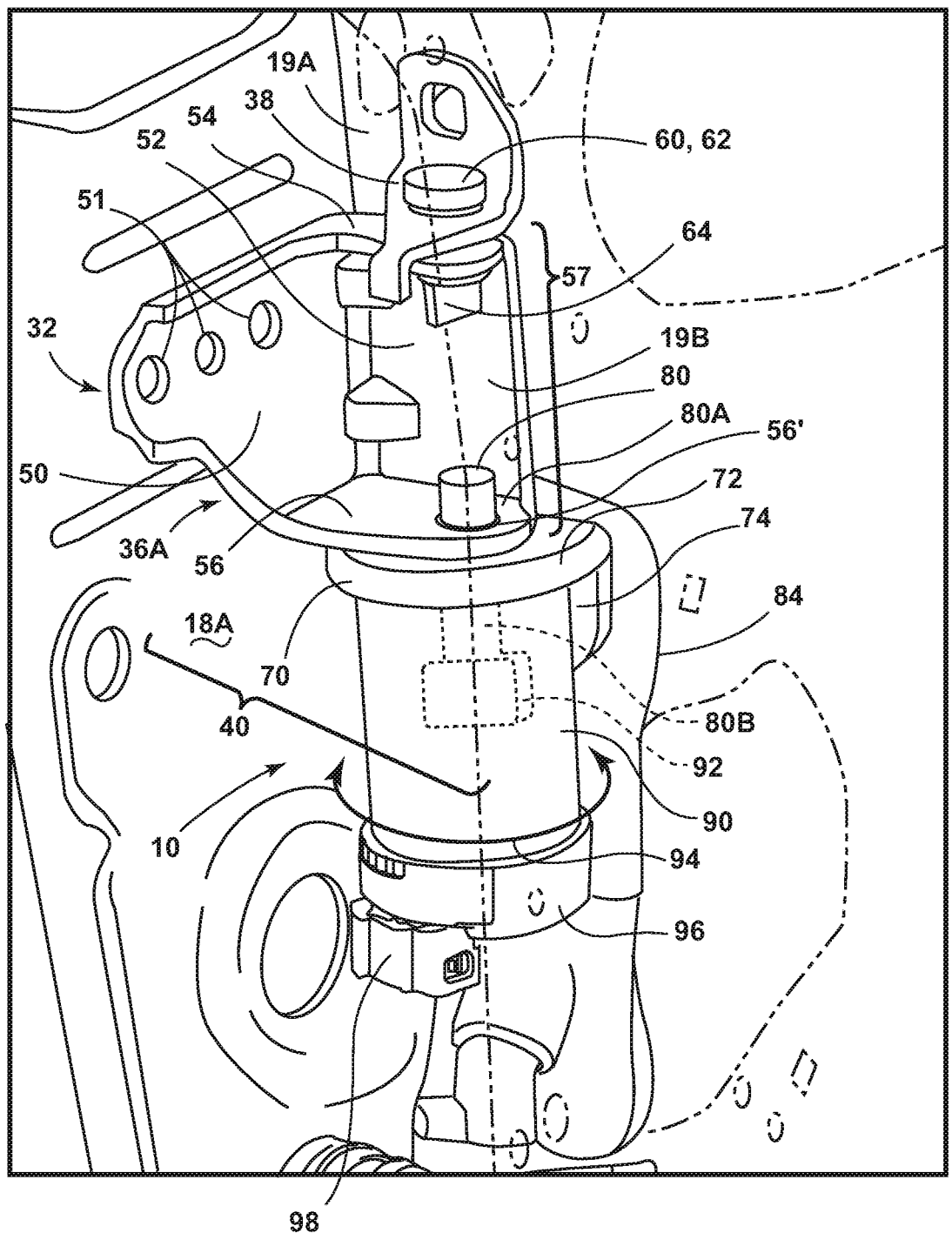
FIG. 4B is a perspective view of the vehicle door of FIG. 4A taken at location IVB.

Referring now to FIG. 4B, the fixed hinge portion 36A of the upper hinge assembly 32 is shown having a first portion 50 having mounting apertures 51 disposed therethrough for mounting the first portion 50 to the hinge-pillar 18A. The fixed hinge portion 36A further includes a second portion 52 extending outwardly from the first portion 50 in a substantially perpendicular direction. The second portion 52 includes upper mounting portion 54 and lower mounting portion 56. The upper mounting portion 54 is spaced-apart from the lower mounting portion 56 to define a clevis 57 therebetween. The spacing between the upper mounting portion 54 and the lower mounting portion 56 provides adequate clearance for tooling necessary to couple and adjust the position of the power assist device 10 to the lower mounting portion 56, and for coupling the moveable hinge portion 38 to the upper mounting portion 54 via hinge pin 60. The hinge pin 60 includes a head portion 62 and a body portion 64 which pivotally couples the fixed hinge portion 36A to the moveable hinge portion 38 at upper mounting portion 54. As noted above, moveable hinge portion 38 is coupled to sidewall 19A of the inner panel 19 in assembly, such that the moveable hinge portion 38 is coupled to and moves with the door 16. Similarly, the power assist device 10 is coupled to an L-shaped bracket having a first portion 72 and a second portion 74 disposed in an L-shaped configuration. The first portion 72 is disposed adjacent to the lower mounting portion 56 of the fixed hinged portion 36A for coupling the power assist device 10 thereto via a driveshaft 80. Specifically, the driveshaft 80 couples the power assist device 10 to the upper hinge assembly 32 at lower mounting portion 56 through aperture 56' of fixed hinge portion 36A. The driveshaft 80 is fixedly coupled to the fixed hinge portion 36A at an upper portion 80A of the driveshaft 80 by any means known in the art, such as a machined press fitting, or a bolt-on connection. The upper portion 80A of the driveshaft 80 may also include an angled cross-section configuration that is complimentary to an angled configuration of mounting aperture 56' of the fixed hinge portion 36A to better couple the driveshaft 80 to the fixed hinge portion 36A. Being fixedly coupled thereto, the driveshaft 80 serves as a pivot axis for the power assist device 10. The power assist device 10 is mounted to the door 16 at inner panel 19 via the second portion 74 of the L-shaped bracket 70 which is coupled to sidewall 19A of inner panel 19, such that the L-shaped bracket 70 rotates with the door 16 between opened and closed positions while the driveshaft 80 remains fixedly coupled to the fixed hinge portion 36A of the upper hinge assembly 32. In this way, the power assist device 10 is essentially coupled to the door 16 at inner panel 19 and operably coupled to the upper hinge assembly 32 to power or control the opening and closing of the door 16, as further described below.

With further reference to FIG. 4B, the power assist device 10 is shown having a motor 92 coupled to a lower portion 80B of the driveshaft 80. The motor 92 and the lower portion 80B of the driveshaft 80 are operably coupled to one another in a driven engagement and housed within the cylindrical body portion 90 of the power assist device 10. The motor 92 is contemplated to be an electric motor, power winch, actuator, servo motor, electric solenoid, pneumatic cylinder, hydraulic cylinder, or other like mechanism having sufficient power necessary to provide the torque required to move the door 16 between open and closed positions, as well as various detent locations, as powered from the hinge point of the door 16. Thus, the motor 92 is configured to act on the driveshaft 80 in a pivoting or rotating manner. With the upper portion 80A of the driveshaft 80 fixedly coupled to the upper hinge assembly 32, the cylindrical body portion 90 of the power assist device 10 will rotate in a manner as indicated by arrow 94 about the pivot axis defined by the driveshaft 80. With the power assist device 10 coupled to the inner panel 19 via L-shaped bracket 70, the rotating motion of the cylindrical body portion 90 of the power assist device 10 correlates to a pivoting motion of the door 16 between open and closed positions. As further shown in FIG. 4B, the power assist device 10 includes a lower cap 96 having an electrical connector 98 disposed thereon powering the device 10 and for receiving signal information from the controller 11 (FIG. 1) for translating user commands into power assisted door functionality.

Figure 4C:
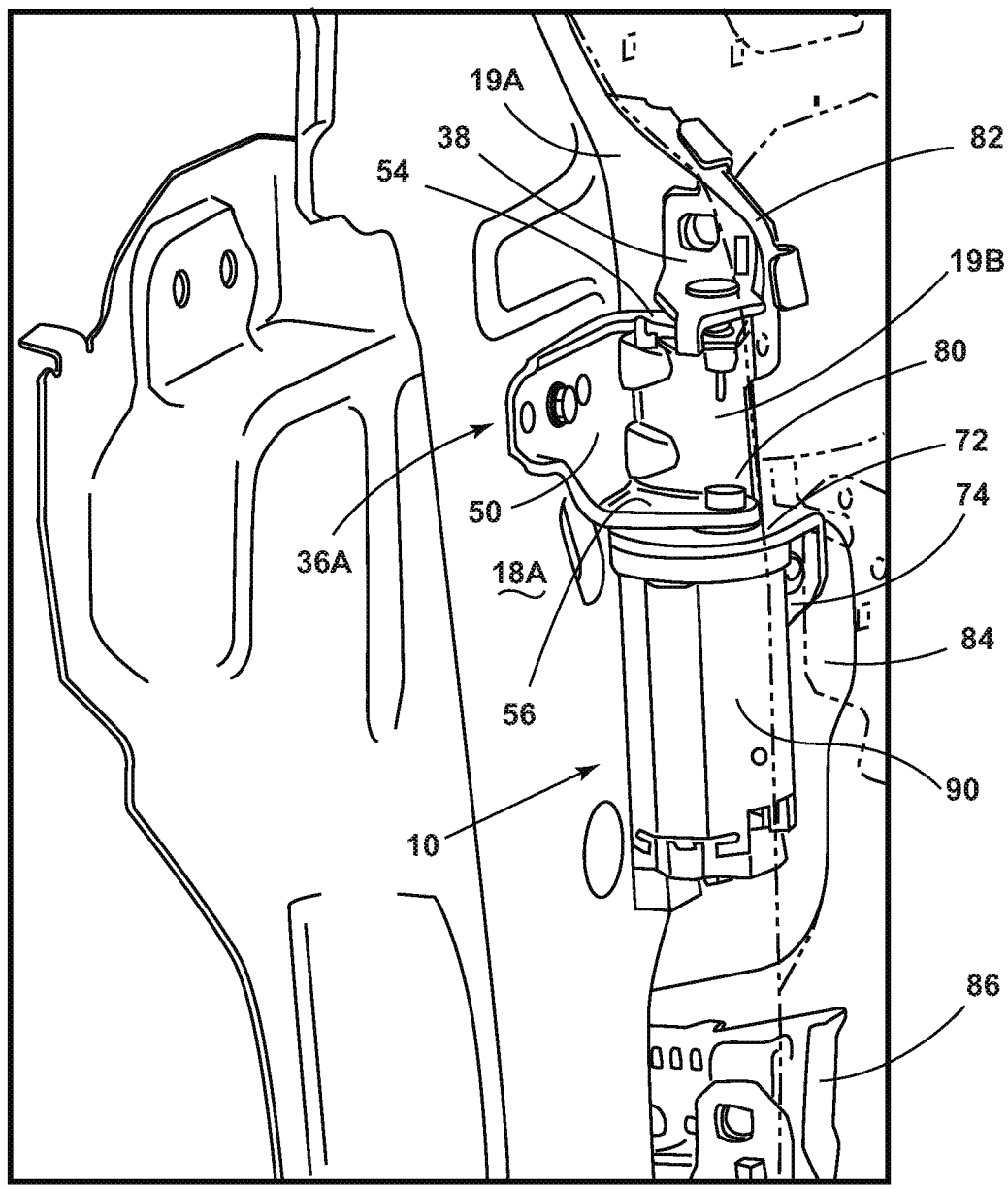
FIG. 4C is a perspective view of the vehicle door of FIG. 4A.
Figure 4D:
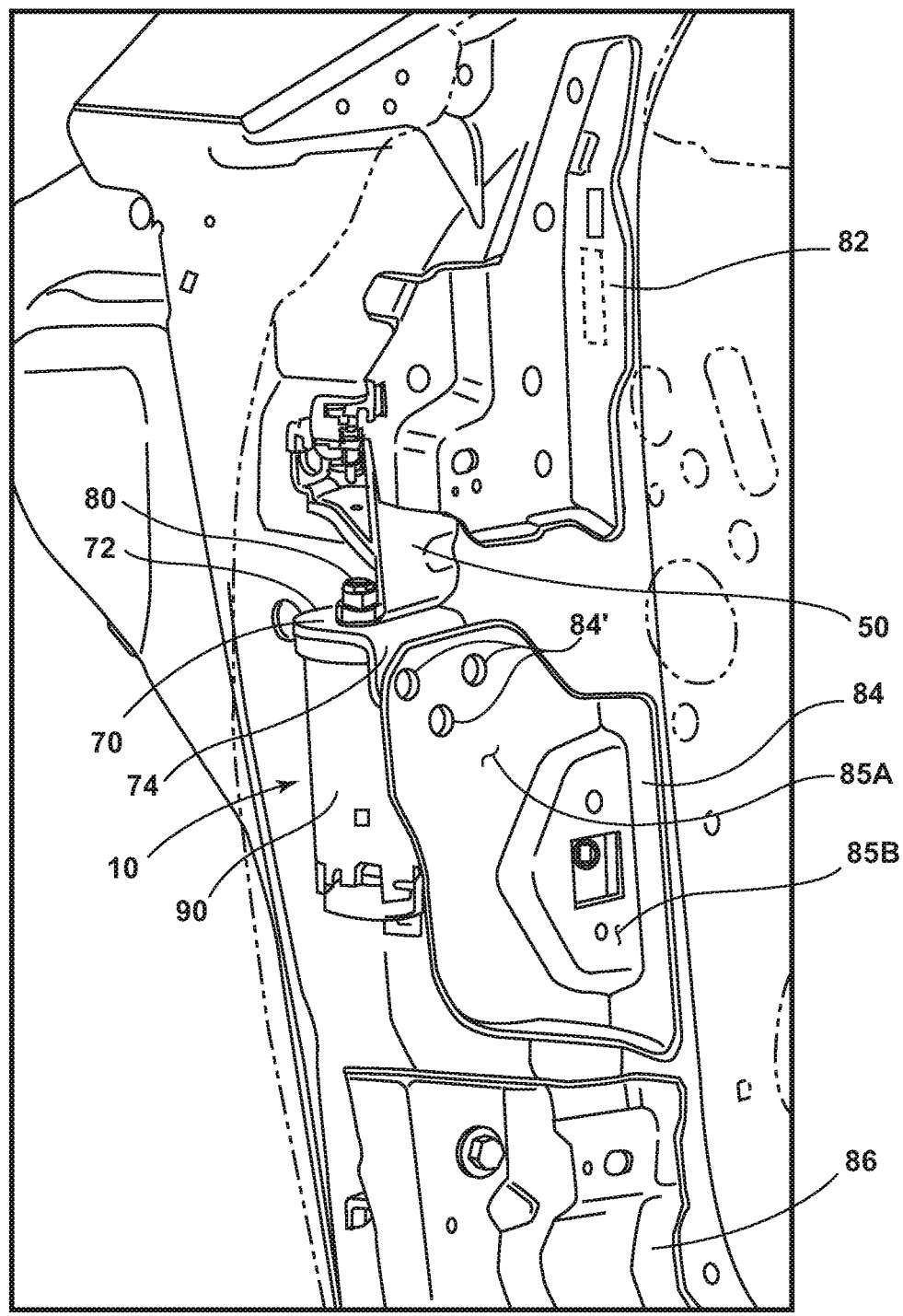
FIG. 4D is a rear perspective view of the vehicle door of FIG. 4A.

Referring now to FIGS. 4C and 4D, a middle door-side bracket 84 is coupled to an opposite side of the sidewall 19A of inner panel 19 relative to the second portion 74 of the L-shaped bracket 70. In this way, the sidewall 19A of the inner panel 19 is sandwiched between the L-shaped bracket 70 at second portion 74 and the middle door-side bracket 84. The middle door-side bracket 84 includes apertures 84' for coupling to complimentary apertures disposed on the second portion 74 of the L-shaped bracket 70 using fasteners, such as bolts. The middle door-side bracket 84 is a modified door-side bracket that provides a reinforced connection between the inner door panel 19 and the power assist device 10, to help stabilize the system from forces imparted on or imparted by the power assist device 10 when moving the door 16 between open and closed positions. With specific reference to FIG. 4D, the middle door-side bracket 84 includes an extended upper portion 85A which includes apertures 84' for coupling to the L-shaped bracket 70 through sidewall 19A. The middle door-side bracket 84 further includes a lower portion 85B which provides reinforcement for a door check device (not shown). As further shown in FIG. 4D, an upper door-side bracket 82 and a lower door-side bracket 86 are also disposed on an opposite side of sidewall 19A relative to the power assist device 10. Together, the door-side brackets 82, 84 and 86 act as doubler plates, providing reinforcement for the upper hinge assembly 32, the power assist device 10, and the lower hinge assembly 34, respectively. In this way, the door 16 of the present concept is heavily reinforced at the connection of the inner panel 19 with the hinge-pillar 18A through the upper and lower hinge assemblies 32, 34 and L-shaped bracket 70 of the power assist device 10 by the door-side brackets 82, 84, 86. The door 16 can also be further reinforced against torque from the power assist device 10 by coupling one or more reinforcement belts 21, 23 (FIG. 3) to the middle door-side bracket 84 and the inner panel 19 across the length of the door 16.

Figure 5A:
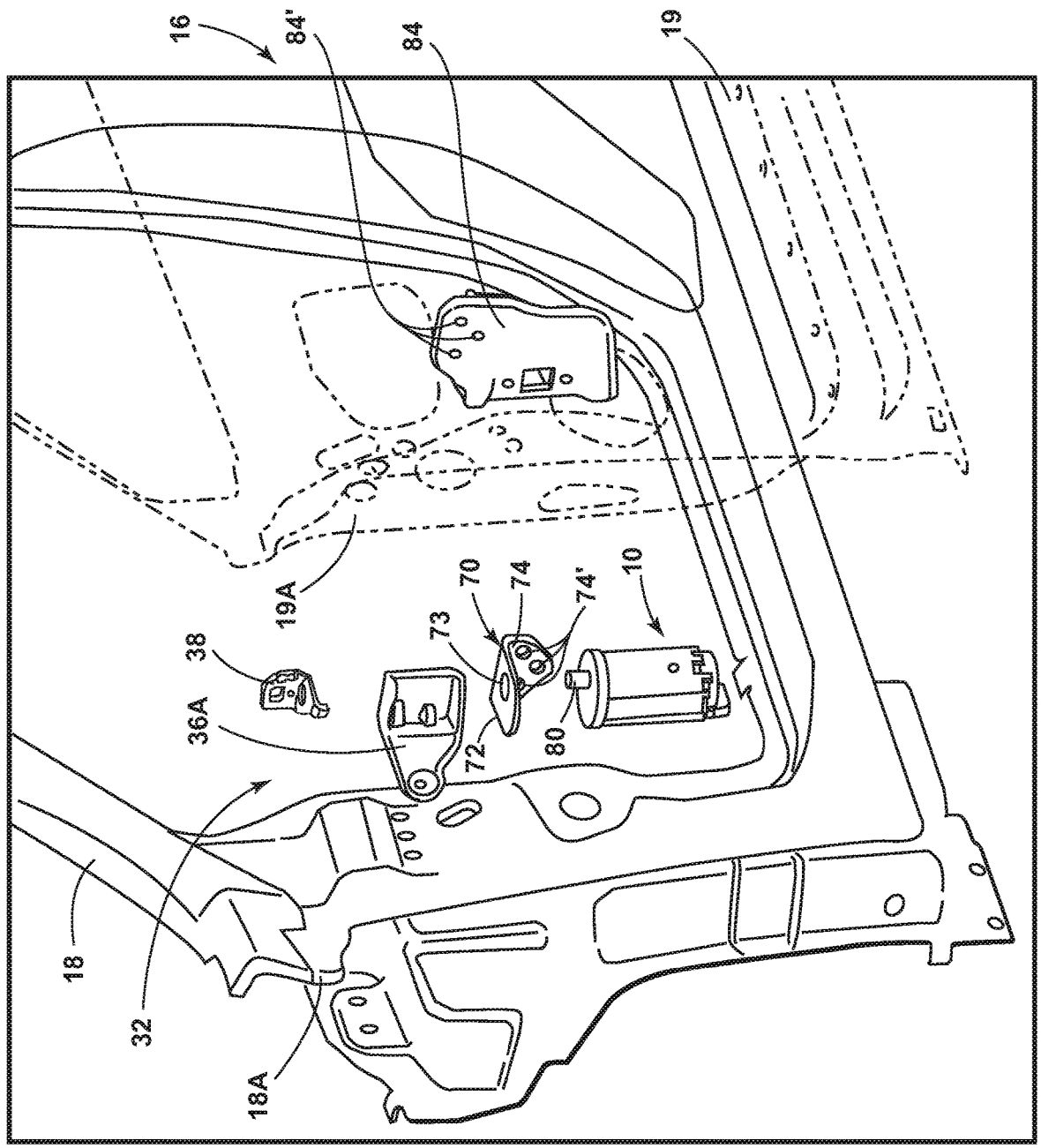
FIG. 5A is a fragmentary exploded view of a vehicle door and a power assist device.

Referring now to FIG. 5A, the door 16 is shown in an exploded view with the outer panel 17 (FIG. 1) removed and the inner panel 19 exploded away in phantom. Middle door-side bracket 84 is shown exploded away from the inner panel 19 and the upper hinge assembly 32 is shown with the fixed hinge portion 36A exploded away from the hinge-pillar 18A, and the moveable hinge portion 38 exploded away from sidewall 19A of the inner panel 19. The door mounted L-shaped bracket 70 is shown exploded away from the sidewall 19A of the inner panel 19 and also exploded away from the power assist device 10. As shown in FIG. 5A, the first portion 72 of the L-shaped bracket 70 includes an aperture 73 for receiving the upper portion 80A of the driveshaft 80 therethrough. As further shown in FIG. 5A, the second portion 74 of the L-shaped bracket 70 is configured to couple to sidewall 19A of inner panel 19 at mounting apertures 74', which coincide with mounting apertures 84' of middle door-side bracket 84 to provide a robust coupling between the door 16 and the power assist device 10.

Figure 5B:
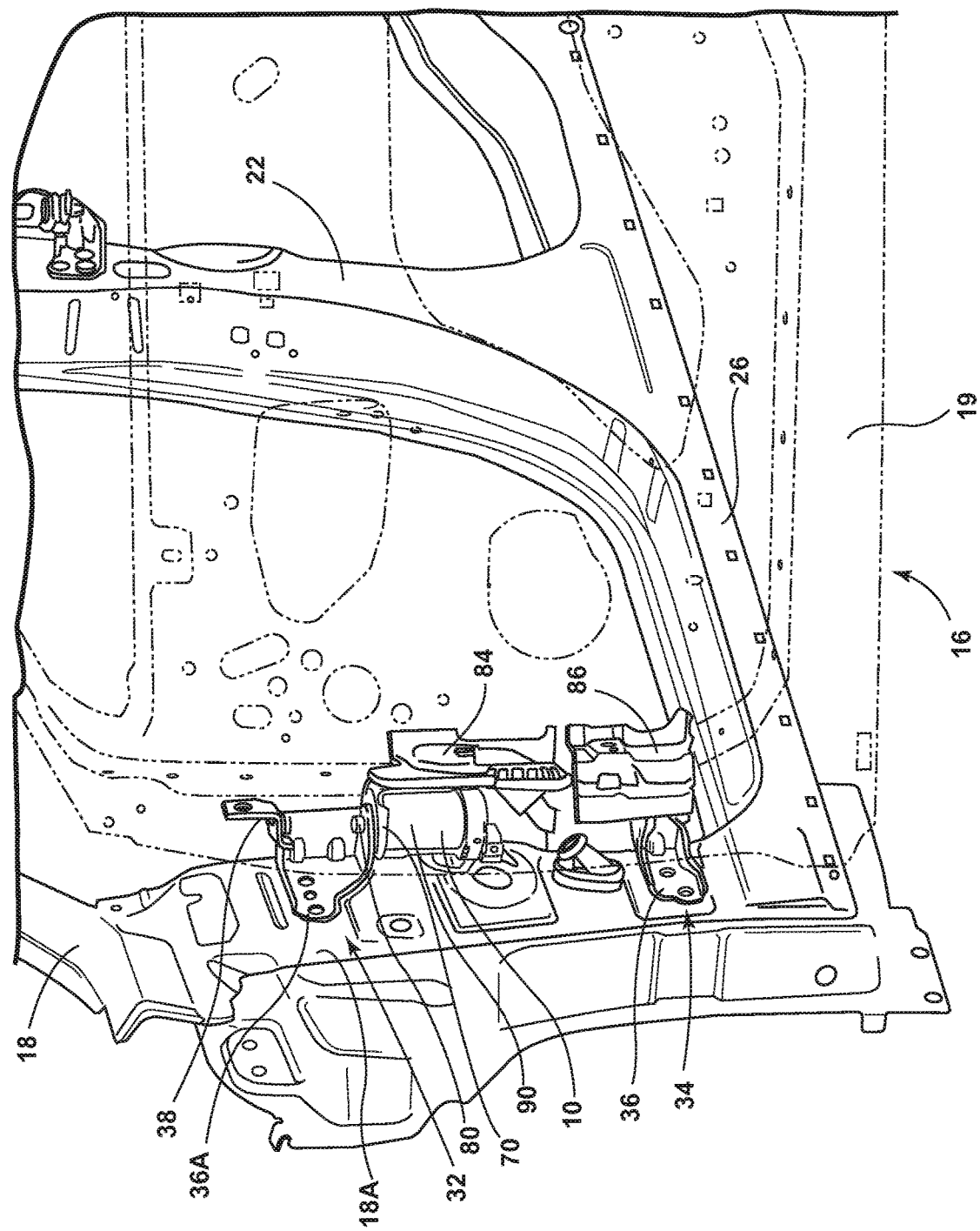
FIG. 5B is a fragmentary assembled view of the vehicle door and power assist device of FIG. 5A, with the door shown in an open position in phantom.

Referring now to FIG. 5B, the door 16 is shown in the open position with the outer panel 17 (FIG. 1) removed and the inner panel 19 shown in phantom. The exploded components for FIG. 5A are shown installed in FIG. 5B, and it is contemplated that the power assist device 10 can be installed in the vehicle during final trim and assembly, wherein the modified upper hinge assembly 32 provides spacing for an installer to radially adjust the power assist device 10 relative to the door 16 for proper axis alignment. Together, the lower mounting portion 56 of clevis 57 (best shown in FIG. 4B), the L-shaped bracket 70, and the middle door-side bracket 84 are used to provide radial adjustment of the power assist device 10 to insure axis alignment between the upper and lower hinge assemblies 30, 32 and the pivot axis of driveshaft 80 of the power assist device 10. As further shown in FIG. 5B, upper door-side bracket 82 has been removed to reveal mounting locations for the upper door-side bracket 82 relative to the moveable hinge portion 38 of the upper hinge assembly 32.

Figure 6:
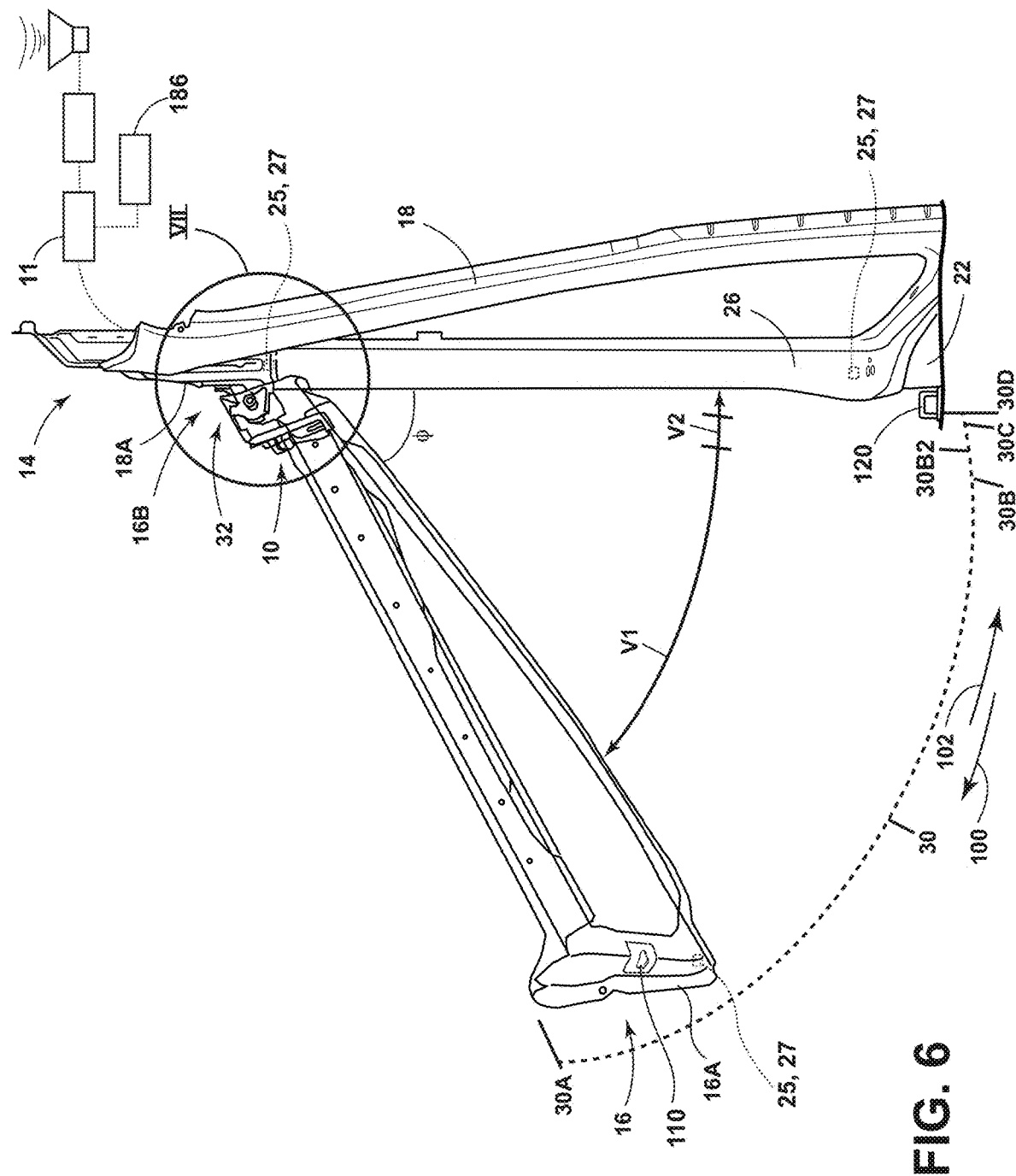
FIG. 6 is a top plan view of a vehicle door showing relative movement of the door between open and closed positions along a door swing path.

One aspect of the present concept is to provide a soft close experience to a user when closing a vehicle door via the power assist device 10. With reference now to FIG. 6, the door 16 is shown in an open position relative to the vehicle body 14. The door swing path 30 is shown having various door positions identified thereon. Specifically, reference point 30A indicates a fully open door position, which is approximately 1000 mm away from a flush and closed position along the curved door swing path 30. The flush and closed position is identified in FIG. 6 as reference point 30C. During a door closing operation, reference point 30B indicates an approximate door position where a soft close feature is initiated by the power assist device 10 to prevent a user from slamming the door 16 to the closed position 30C. Reference point 30D indicates an over-closed door position that is generally required in order to get a latch mechanism 110, disposed the door 16, to latch the door 16 in the closed position 30C. In normal operation, once latched by movement to the over-closed position 30D, the door 16 may slightly revert towards reference point 30C which indicates a door position that is essentially closed and flush with the vehicle body 14. In a normal door closing procedure, the door 16 is in a closing motion from reference point 30A, and the first time the door 16 reaches the position of reference point 30C, the door 16 will be flush with the vehicle body 14 but unlatched. In a normal door closing procedure, the door 16 must move from reference point 30C to the over-closed position at reference point 30D so that the door 16 will latch to the vehicle body 14. Then, the door 16 may slightly rebound towards the latched and flush position at reference point 30C. The present concept contemplates a sequence of door positions and latch configurations that can avoid the need to move the door 16 to the over-closed position 30D, while still getting the door 16 to latch to the vehicle body 14.

The door swing path 30 shown in FIG. 6 represents a swing path taken from the point of the door edge 16A. The hinge axis or hinge point for the door 16 is represented by reference numeral 16B. It is the hinge axis 16B from which the power assist device 10 controls the movement of the door 16, as described above. With reference to Table 1 below, the angle of the vehicle door 16 is shown along with the distance of the door edge 16A to the closed position 30C in millimeters. The torque required by the power assist device 10 is shown in Table 1 in order to close the vehicle door 16 from the various open door positions identified on swing path 30 in FIG. 6. The torque required to close the door 16 is shown in Table 1 as "with" and "without" inertia. For the purposes of this disclosure the term "with inertia" implies that the door 16 is shut from a distance sufficient to generate inertia in the door movement, such that less torque is required from the power assist device 10. Further, inertia can be generated by an initial closing motion manually imparted on the door 16 by a user. Inertia is equal to the mass of the door 16 (about 60-90 lbs or 30-40 kg) times the rotational velocity (V1 in FIG. 6). When a user attempts to slam the door 16 along the rotational path 30, the power assist device 10 is configured to slow the door movement or rotational velocity V1 to velocity V2 to provide a slow closing motion. With regards to a user slamming the door 16, a 10 N/m acceleration applied continuously to a door for 60° rotation of the door is a very dramatic door slam with a terminal velocity of approximately 15 rpm or 90°/sec. For purposes of this disclosure any velocity of 5 rpm (30°/sec)—15 rpm (90°/sec) is considered slamming the door 16. In a normal closing motion, a user will generally give a door a minimum of 0.33 rpm or 2°/sec at least the last 5° of the closing motion to sufficiently close the door.

TABLE 1

| Door Position | Door edge Distance to latch (mm) | Angle from vehicle body | Torque to close with inertia (N/m) | Torque to close without inertia (N/m) |
|---|---|---|---|---|
| 30A | 1000 mm | 60+ deg | <10 N/m | 40 N/m |
| 30B | 175 mm | 20 deg | 40 N/m | 40 N/m |
| 30B-2 | 70 mm | 8 deg | 40 N/m | 100 N/m |
| 30C | 25 mm | 1.6 deg | 80 N/m | 300 N/m |
| 30D | 15 mm | 1 deg | 200 N/m | 610 N/m |

Consistent with Table 1 above, movement of the door 16 from position 30A to position 30B is approximately 825 mm and identifies a portion of the swing path 30 between position 30A and 30B that could be a slamming motion initiated by a user. As a user manually initiates a door slamming motion, the door 16 will move along the door swing path 30 at an initial velocity V1 (approximately 5-15 rpm) until the door 16 reaches position 30B. At approximately position 30B, the door 16 will slow to a velocity V2 (approximately 0.33 rpm) by a resistance force imparted by the power assist device 10 on the upper hinge assembly 32 to slow the door movement between positions 30B and 30C from velocity V1 to velocity V2. It is contemplated that the torque required by the power assist device 10 to slow the door 16 to a slow and gentle close of 0.33 rpm along the door swing path 30 is approximately 200 N/m. The amount of time required for slowing the movement of the door 16 from velocity V1 to velocity V2 between door positions 30B to 30C is approximately 200-300 milliseconds. It is contemplated that the power assist device 10 will operate in this manner to absorb the energy from the slamming door motion along swing path 30 while the vehicle is in a key-off operation. Driving operation is not required for the slow close functionality. In this way, the power assist device 10 provides a gentle close or slow close for the door 16, even when a user attempts to slam the door 16 shut.

With further reference to FIG. 6, a door opening direction is indicated by reference numeral 100. The door 16 of the present concept is contemplated to be in communication with a variety of sensors which are configured to detect an object positioned in the door swing path 30, such that the power assist device 10 of the present concept can slow or stop the door 16 to prevent the door 16 from opening into an object positioned along the door's swing path 30, when such an object is detected. The torque required to slow or stop the door 16 during the opening movement (path 100) is contemplated to be approximately 200 N/m and is further contemplated to take approximately 200-300 milliseconds during a user initiated door opening sequence. Further, the power assist device 10 of the present concept provides the door 16 with an infinite number of detents (door checks) along the swing path 30. The position of the detents or door checks may be customized by the user and programmed into the controller 11 (FIG. 1) which is in communication with the power assist device 10, for controlling movement of the same. The door checks are contemplated for use with an automatic door opening sequence powered by the power assist device 10 in the direction as indicated by arrow 100. The torque required to stop the door 16 during an automatic door opening sequence powered by the power assist device 10 at a predetermined door check position is approximately 10-50 N/m and may take up to 60 seconds. In this way, the power assist device 10 can be preprogrammed by a user to open the door 16 to a desired door check position along the door swing path 30 and hold the door 16 at the selected door check position for the user to enter or exit the vehicle without worry of the door 16 opening any further, or possibly into an adjacent obstruction. In this way, the power assist device 10 of the present concept provides infinite door check along the swing path 30 of the door 16. Pre-set door check positions may be preprogrammed into the controller 11 (FIG. 1), and user selected/customized door checks may also be programmed into the controller 11.

With further reference to FIG. 6, another aspect of the present concept includes the ability to reduce door opening and closing efforts when the vehicle is parked on a hill or slope. The power assist device 10 is contemplated to be provided with signal information from the controller 11 to provide assistance in opening the door 16 in the direction as indicated by arrow 100 in a slow and consistent manner when a vehicle position is declined, such that the door opening motion would generally be increased due to an downward angle of the vehicle from the back to the front of the vehicle. As a corollary, the power assist device 10 can provide door closing assistance to aid in closing a door that is positioned at a downward angle, so that both the door opening and door closing efforts are consistent. Similarly, when the vehicle is parked on an inclined or up-hill slope, the power assist device 10 is configured to provide a reduced closing velocity of the door 16 in the closing direction as indicated by arrow 102 based on signal information received from the controller 11 to the power assist device 10. The power assist device 10 can also provide door opening assistance to aid in opening a door that is positioned at an upward angle, for consistency. It is contemplated that such power assistance in the direction as indicated by arrows 100, 102, would require up to 200 N/m of torque for a duration of approximately 10-20 seconds. In this way, the power assist device 10 of the present concept is able to provide consistent door opening and closing efforts, such that the user is provided a consistent door opening and closing experience regardless of the inclined, declined or substantially horizontal position of the vehicle.

Figure 7:
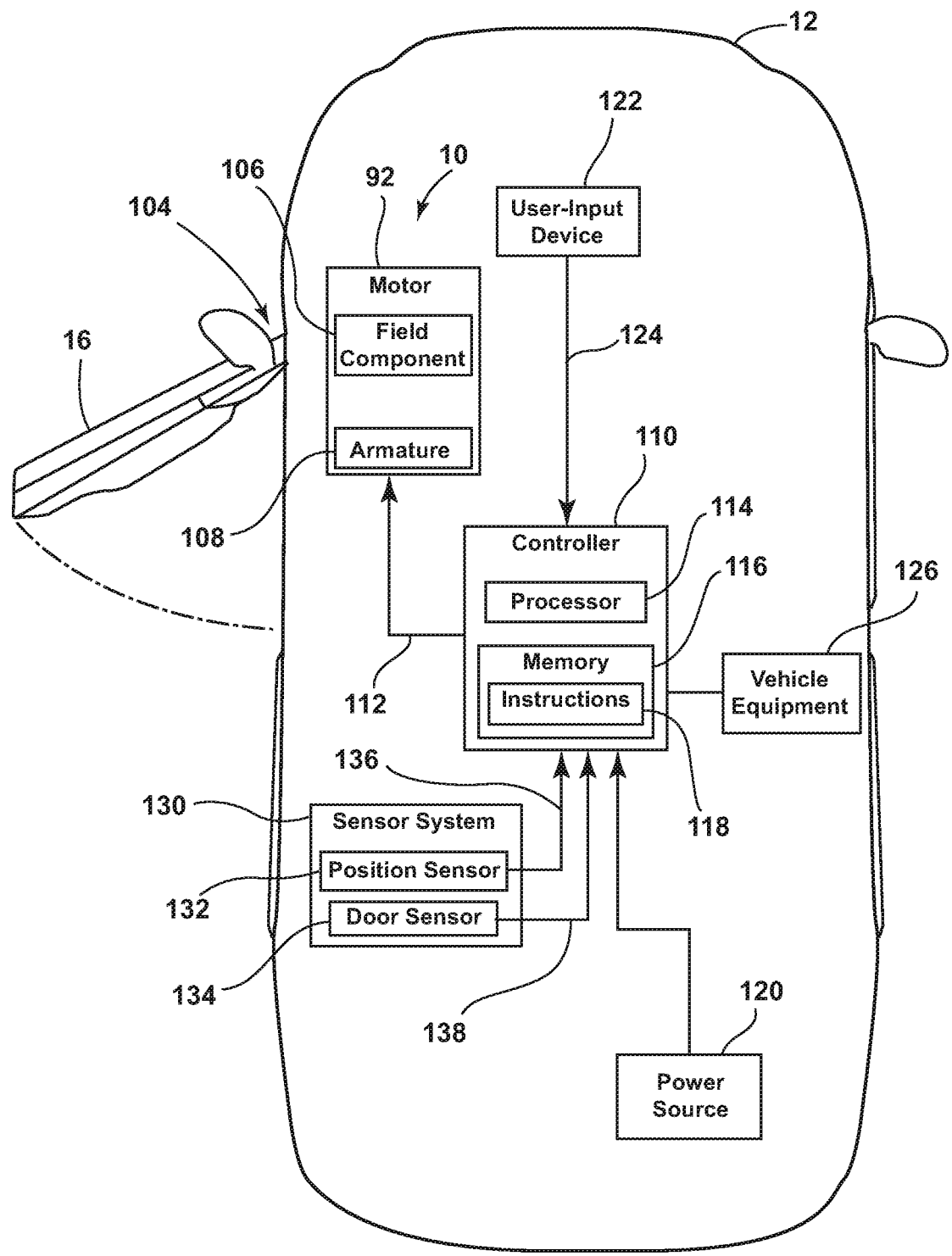
FIG. 7 is a schematic diagram showing a vehicle door assembly according to one embodiment.

Referring to FIG. 7, a vehicle door assembly 104 is shown according to one embodiment. The vehicle door assembly 104 includes a power assist device 10, which may be configured according to any of the embodiments described herein and includes a motor 92 operatively coupled to a door 16 of a vehicle 12. According to one embodiment, the motor 92 may be a brushless or brushed direct-current motor and includes a field component 106 for generating a magnetic field and an armature 108 having an input current that interacts with the magnetic field to produce torque. Alternatively, it is contemplated that the motor 92 may be a switched reluctance motor. As already described herein, the motor 92 may act on the driveshaft 80 (e.g., FIG. 4B) in a pivoting or rotating manner and the torque generated by the motor 92 may be used to assist a user in moving the door 16 between open and closed positions, as well as various detent locations. Additionally, in some embodiments, the motor 92 may be configured to apply a mechanical resistance to the door 16 to resist door swing.

The motor 92 is controlled by a controller 110 that may supply signals 112 to the motor 92 through an electrical connector 98 (e.g., FIG. 4B) to achieve a variety of motor actions. The controller 110 may include a processor 114 and a memory 116 having instructions 118 stored thereon that serve to effectuate the power assist functionality described herein. The controller 110 may be a dedicated controller or one belonging to another vehicle system. While not shown, it should be appreciated that the controller 110 may be interfaced with additional power assist devices that are operatively coupled with other doors of the vehicle 10. The controller 110 may be electrically coupled to a power source 120 for controlling power delivery to the motor 92. The power source 120 may be a vehicle power source or an independent power source.

With continued reference to FIG. 7, the controller 110 is communicatively coupled to a user-input device 122 for supplying to the controller 110 one or more user-inputted selections 124 for controlling door swing. It is contemplated that the user-input device 122 may be an onboard device or a portable electronic device configured to wirelessly communicate with the controller 110 such as a smartphone and the like. User-inputted selections may be inputted via the user-input device 122 in a variety of manners. For example, it is contemplated that the user-input device 122 may include a touch screen to allow a user to make his or her selections through one or more touch events. Additionally or alternatively, a user may make his or her selections through the manipulation of buttons, sliders, knobs, etc. Additionally or alternatively still, it is contemplated that a user may make his or her selections through voice commands. In any event, by providing a user with the ability to make selections to dictate how the motor 92 behaves, the manner in which the door 16 swings during a door opening or door closing event becomes customizable to suit the needs of the user, which may vary based on age, size, strength, operational environment, etc.

According to one embodiment, a user may make one or more user-inputted selections for specifying a torque applied by the motor 92 to the door 16 to assist the user with opening or closing the door 16. The torque applied by the motor 92 to the door 16 may be a function of an angular position of the door 16. By way of example, the swing path 30 shown in FIG. 6 may be displayed to a user on a display 186 (e.g., the touch screen) so that he or she may make one or more selections specifying a torque to be applied by the motor 92 to the door 16 at one or more angular positions of the door 16, wherein each angular position of the door 16 corresponds to a position on the swing path 30. The angular position(s) may correspond to distinct door positions and/or a range of positions, as specified by the user. For example, a user may specify a torque to be applied by the motor 92 to the door 16 at positions 30A, 30B, 30C, and 30D, respectively. Along with specifying an amount of torque, the user may also specify a direction in which the torque is applied, thus allowing the user to control torque while the door 16 is being moved open or closed. Furthermore, it is contemplated that the user may make torque selections based on an operating condition of the vehicle 12. For example, different torque selections can be implemented based on whether the vehicle ignition is turned ON or OFF.

The amount of torque for a given angular position of the door 16 may be selected from a range of available torques to allow a user to fine tune his or her preferences. Additionally or alternatively, the user may assign a predetermined torque setting to a given angular door position should he or she desire a relatively easier set up process. Examples of torque settings include a low torque setting, a medium torque setting, a high torque setting, and so on. The selection(s) made by the user may be stored as a torque profile in memory 116 and incorporated into instructions 118. By allowing a user to program the amount of torque applied by the motor 92 to the door 16, the user is able to customize the manner in which the motor 92 assists with the opening and closing of the door 16 based on his or her strength levels along with any other considerations such as whether the vehicle 12 is on an incline, decline, or substantially straight surface. As such, it is contemplated that multiple torque profiles may be saved and implemented based on a position and/or an operational environment of the vehicle 12 along with any needs of the user. A given torque profile may be selected manually via the user-input device 122 or automatically selected by the controller 110. In determining which torque profile to select, the controller 110 may rely on information provided from a variety of vehicle equipment 126, which may include sensors (e.g., accelerometer) or sensor systems, global positioning systems, and any other equipment for assessing information related to vehicle positioning, door positioning, and/or an operational environment of the vehicle 12.

In operation, the controller 110 communicates with a sensor system 130 that includes a position sensor 132 and a door sensor 134, where position sensor 132 is operatively coupled to the motor 92 for sensing an angular position of the motor 92 and door sensor 134 is operatively coupled to the door 16 for sensing a position of the door 16 such as whether the door 16 is in an open or a closed position. Since angular displacement of the motor 92 is directly correlated to that of the door 16 by virtue of their mechanical coupling, the controller 110 is able to deduce the angular position and swing direction of the door 16 based on angular position information 136 of the motor 92 reported by the position sensor 132 thereby enabling the controller 110 to control the motor 92 according to selections made by a user or a default setting. In tracking the position of the motor 92, the controller 110 may reset the angular position of the motor 92 to zero whenever the door 16 is in a closed position as indicated by door information 138 provided to the controller 110 from door sensor 134.

In some instances, instead of generating torque, the motor 92 may operate to resist torque applied to the door 16 from a source independent of the motor 92 such as torque exerted on the door 16 by a user or torque stemming from environmental conditions such as wind, gravity (due to the vehicle 12 being on an incline or decline), etc. According to one embodiment, the controller 110 controls a mechanical resistance applied by the motor 92 to the door 16 to resist door swing. The amount of mechanical resistance may be specified via the user-input device 122 and be a function of an angular position of the door 16. The amount of mechanical resistance for a given angular position of the door 16 may be selected from a range of available mechanical resistances or predetermined settings. Additionally or alternatively, the amount of mechanical resistance may be a function of a door swing direction, thereby allowing a user to make mechanical resistance selections based on whether the door 16 is being opened or closed. The mechanical resistance(s) specified by a user may be stored as resistance profiles in memory 116 and implemented by the controller 110 through manual or automatic activation. The controller 110 may call upon a given resistance profile based on factors including a position of the vehicle 12, a door position, and/or an operating environment of the vehicle 12.

Figure 8:
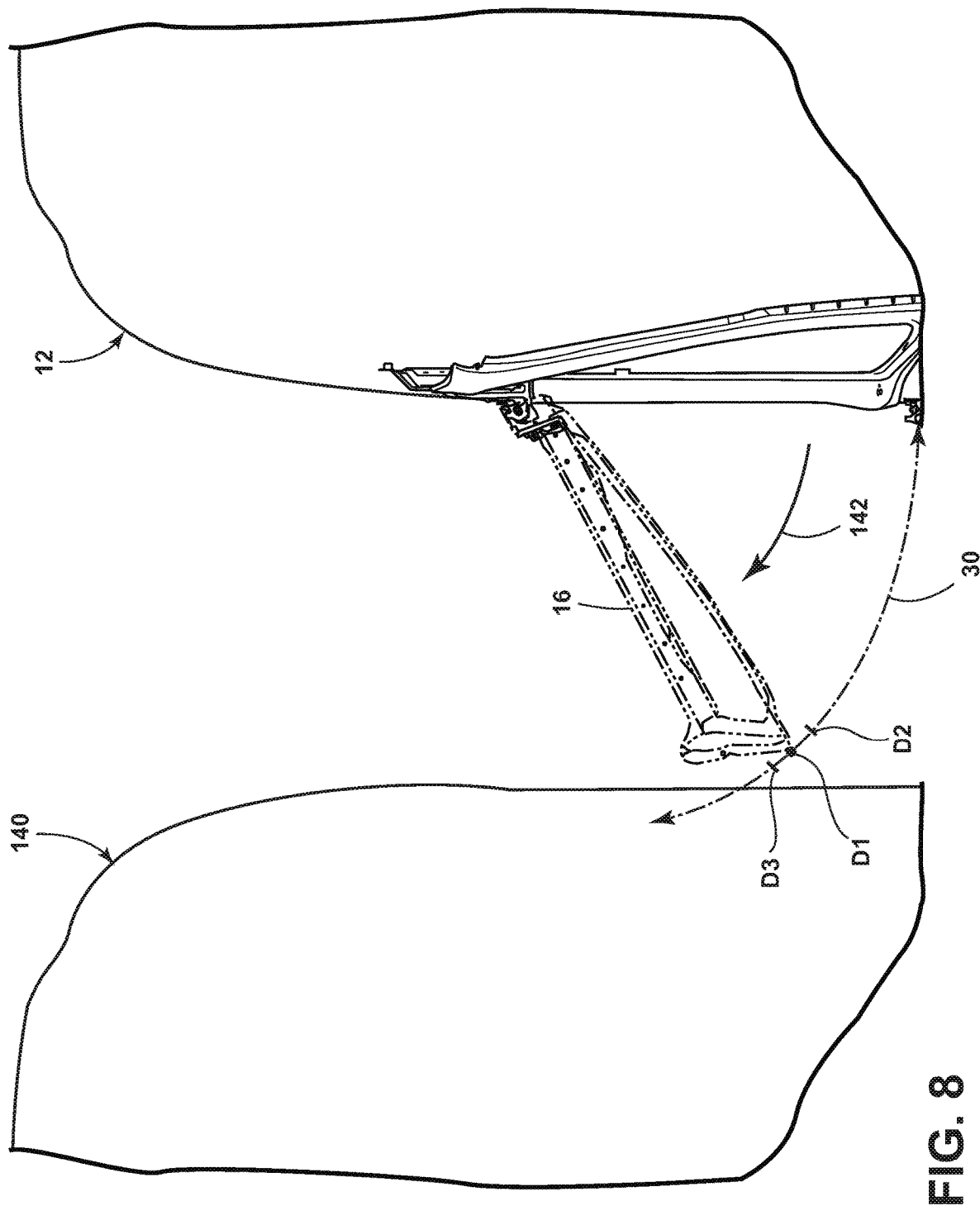
FIG. 8 is a top plan view of a vehicle door showing a door detent position along a door swing path for preventing the door from colliding with an obstruction.

Referring to FIG. 8, an exemplary resistance profile is shown, in which a programmable detent has been created. As shown in FIG. 8, vehicle 12 is positioned next to an obstruction, shown as vehicle 140, to represent an operating environment in which a user is parked in his or her garage. In such instances, it is quite common for portions of the swing path 30 of the door 16 to travel into the obstruction resulting in damage to the door 16 along with the obstruction itself should the door travel that far. To avoid this, a user may specify a mechanical resistance to be applied to the door 16 at an angular position such as angular position D1, which is located on a portion of the swing path 30 that does not cross vehicle 140. In this instance, the mechanical resistance is also selected to generate a holding force that opposes door travel in the direction specified by arrow 142 to prevent the door 16 from colliding with vehicle 140. Additionally, the user may select a duration for how long the mechanical resistance is applied to the door 16. As described herein, the illustrated resistance profile may be activated manually or automatically. According to one embodiment, the resistance profile is activated automatically by the controller 110 based on signals received from vehicle equipment 126, which may include a global positioning system for signaling to the controller 110 that the vehicle 12 is located in the user's garage. When the vehicle 12 is located elsewhere, a different resistance profile may be used, if available. While a programmable detent has been illustrated at angular position D1, it should be appreciated that a programmable detent may be specified across a range of angular positions in the alternative. For example, in the illustrated embodiment, a user may specify a door detent degree range spanning from angular positions D2 to D3 in which a constant or varied mechanical resistance may be applied by the motor 92 to the door 16 to resist door swing in the direction specified by arrow 142. Thus, it should be appreciated that the user-inputted selections may include specifying an allowable direction in which the door 16 can swing.

In operation, the controller 110 may control the motor 92 to apply mechanical resistance in a variety of manners. According to one embodiment, the controller 110 is configured to partially or fully short the field component 106 thereby making it more difficult to turn the armature 108. The resulting mechanical resistance is generally sufficient for a user desiring an increase in mechanical resistance when opening or closing a door 16 so as to prevent the door 16 from swinging too quickly. When a user is closing the door 16, the added mechanical resistance helps to prevent the door 16 from slamming against the body of the vehicle 12. Similarly, when a user is opening the door 16, the added mechanical resistance helps to prevent the door 16 from travelling too quickly and potentially colliding with an object before the user becomes aware. If desiring to detain the door 16 (e.g., creating a controlled detent), the controller 110 may apply current only to the field component 106 to further increase the difficulty in turning the armature 108. Should a higher holding torque be desired, such as when the vehicle 12 is located on a steep incline, the controller 110 may control the motor 92 using position control feedback. Another situation where a higher holding torque is desirable involves instances where the door 16 is used to assist with egress and ingress from the vehicle 12. For example, some people, such as the elderly, use doors to support themselves while entering or exiting a vehicle. If the door is not in a detained position, the door may swing causing the person to lose his or her balance. This problem is alleviated by creating a controlled detent at the appropriate door position. Thus, by virtue of the aforementioned control schemes, a user is provided with a greater flexibility in controlling door swing behavior. Furthermore, due to the programmability of the power assist device 10 described herein, conventional mechanical detents are no longer needed. In instances where current applied to the motor 92 becomes excessive, the controller 110 may shut down power delivery to the motor 92 to allow the door 16 to move to the direction limit.

Accordingly, by operatively coupling a motor 92 to a door 16 and controlling the motor 92 based on one or more user-inputted selections made through a user-input device 122, a user is able to control the door swing of the door 16. As described herein, selections made by the user may result in the motor 92 being controlled to apply a torque to the door 16 in order to assist the user with opening or closing the door 16. Alternatively, selections made by the user may result in the motor 92 being controlled to apply a mechanical resistance to the door 16 in order to resist door swing. Control of the motor 92 may occur manually or automatically using a controller 110. While controlling the motor 92, the controller 110 may receive signals from vehicle equipment 126 to ensure proper motor functionality. Selections made by the user may be stored as torque and resistance profiles that are retrieved based on a variety of considerations. In this manner, a user is provided the ability to customize the manner in which a door 16 behaves to better suit his or her needs.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A power assist device comprising:
   a motor operatively coupled to a door of a vehicle;
   a display configured to display an arcuate swing path of the door that the door is able to move between a first position and a second position;
   a controller for controlling the motor; and
   a user-input device for supplying the controller with one or more user-inputted selections for controlling a door swing of the door, wherein the user-inputted selections are created by one or more user-inputs received by the user-input device.

2. The power assist device of claim 1, wherein the one or more user-inputted selections includes one or more door detent positions.

3. The power assist device of claim 2, wherein each of the one or more detent positions corresponds to a position of the door on the swing path of the door.

4. The power assist device of claim 1, wherein the one or more user-inputted selections includes a door detent degree range.

5. The power assist device of claim 1, wherein the one or more user-inputted selections includes specifying a mechanical resistance applied by the motor to the door to resist a swinging movement of the door.

6. The power assist device of claim 1, wherein the one or more user-inputted selections includes specifying an allowable direction in which the door can swing.

7. The power assist device of claim 1, wherein the user-input device and the display comprise a touchscreen device.

8. A vehicle door assembly comprising:
   a door of a vehicle;
   a power assist device comprising:
      a motor operatively coupled to the door;
      a controller for controlling the motor;
      a display configured to display an arcuate swing path of the door that the door is able to move between a first position and a second position; and
      a user-input device for supplying the controller with one or more user-inputted selections for controlling a door swing of the door, wherein the user-inputted selections are created by one or more user-inputs received by the user-input device, via one or more user-inputted selections specifying one or more door detent positions, each of the one or more door detent positions corresponds to a position on the swing path shown on the display.

9. The vehicle door assembly of claim 8, wherein the one or more user-inputted selections includes specifying a length of an arc between the first and second positions.

10. The vehicle door assembly of claim 8, wherein the one or more user-inputted selections further includes specifying a mechanical resistance applied by the motor to the door to resist a swinging movement of the door.

11. The vehicle door assembly of claim 8, wherein the one or more user-inputted selections further includes specifying an allowable direction in which the door can swing.

12. The vehicle door assembly of claim 8, wherein the user-input device and the display comprise a touchscreen device.

13. The vehicle door assembly of claim 12, wherein the touchscreen device is located in the vehicle.

14. A method of controlling a vehicle door, comprising the steps of:

operatively coupling a motor to the door;

displaying on a display an arcuate swing path of the door that the door is able to move between a first position and a second position;

providing a controller for controlling the motor;

receiving user-input on a user-input device, supplying the controller with the user-input wherein the user-input specifies one or more door detent positions for controlling a door swing of the door; and controlling the motor based on the user-input.

15. The method of claim 14, wherein the user-input device and the display comprise a touchscreen device.

16. The method of claim 14, wherein each of the one or more door detent positions corresponds to a position on the swing path shown on the display.

17. The method of claim 14, wherein the user-input further specifies a length of an arc between the first and second positions.

18. The method of claim 14, wherein the user-input further specifies a mechanical resistance to be applied by the motor to the door to resist a swinging movement of the door.

19. The method of claim 14, wherein the user-input further specifies an allowable direction in which the door can swing.

* * * * *